(12) United States Patent
Miner et al.

(10) Patent No.: US 8,615,717 B2
(45) Date of Patent: *Dec. 24, 2013

(54) ADDRESS BAR USER INTERFACE CONTROL

(75) Inventors: Patrice L. Miner, Kirkland, WA (US); Zeke Odins-Lucas, Bellevue, WA (US); David G. DeVorchik, Seattle, WA (US); Charles Cummins, Seattle, WA (US); Paul A. Gusmorino, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 269 days.

This patent is subject to a terminal disclaimer.

(21) Appl. No.: 12/967,827

(22) Filed: Dec. 14, 2010

(65) Prior Publication Data

US 2011/0083097 A1 Apr. 7, 2011

Related U.S. Application Data

(63) Continuation of application No. 11/111,973, filed on Apr. 22, 2005, now Pat. No. 7,853,890, and a continuation-in-part of application No. 10/420,040, filed on Apr. 17, 2003, now Pat. No. 7,240,292.

(51) Int. Cl.
*G06F 15/00* (2006.01)
*G06F 13/00* (2006.01)

(52) U.S. Cl.
USPC .......................................... 715/778; 715/751

(58) Field of Classification Search
USPC ......... 715/778–800, 751, 759, 810, 853–854, 715/855, 828
See application file for complete search history.

(56) References Cited

U.S. PATENT DOCUMENTS

| 4,438,505 A | 3/1984 | Yanagiuchi |
| 5,065,347 A | 11/1991 | Pajak et al. |
| 5,691,744 A | 11/1997 | Anstotz et al. |
| 5,701,926 A | 12/1997 | Luisi |

(Continued)

FOREIGN PATENT DOCUMENTS

| CN | 1239239 A | 12/1999 |
| EP | 1089196 | 4/2001 |

(Continued)

OTHER PUBLICATIONS

Johnson B, et al., "Tree-maps: a space-filling approach to the visualization of hierarchical information structures," Visualization, 1991, Proceedings, IEEE Conference in San Diego, IEEE Comput. Soc. US, Oct. 22, 1991, pp. 284-291.

*Primary Examiner* — Cao "Kevin" Nguyen
(74) *Attorney, Agent, or Firm* — Shook, Hardy & Bacon L.L.P.

(57) ABSTRACT

An address bar user interface control includes a plurality of interactive segments, each segment including one or more filters or selection criteria for selecting content from physical and/or virtual locations. A segment may include two or more filters or selection criteria which are logically combined such as by a logical "OR" operation. A user may select a child control associated with an interactive segment, i.e., a parent segment, to provide a list of selectable child filters or selection criteria. In response to selection of a child filter or selection criteria, an interactive segment representing the child filter or selection criteria is added to the address bar succeeding the parent segment and the interactive segments subsequent to the parent segment are removed.

17 Claims, 14 Drawing Sheets

(56) References Cited

U.S. PATENT DOCUMENTS

| | | |
|---|---|---|
| 5,721,908 A | 2/1998 | Lagarde et al. |
| 5,787,413 A | 7/1998 | Kauffman et al. |
| 5,828,376 A | 10/1998 | Solimene |
| 5,917,492 A | 6/1999 | Bereiter et al. |
| 5,982,369 A | 11/1999 | Sciammarella |
| 6,182,092 B1 | 1/2001 | Francis et al. |
| 6,185,574 B1 | 2/2001 | Howard et al. |
| 6,195,650 B1 | 2/2001 | Gaither et al. |
| 6,247,020 B1 | 6/2001 | Minard |
| 6,271,846 B1 | 8/2001 | Martinez |
| 6,317,777 B1 | 11/2001 | Skarbo et al. |
| 6,356,908 B1 | 3/2002 | Brown et al. |
| 6,370,518 B1 | 4/2002 | Payne et al. |
| 6,374,260 B1 | 4/2002 | Hoffert et al. |
| 6,385,641 B1 | 5/2002 | Jiang et al. |
| 6,393,429 B1 | 5/2002 | Yagi et al. |
| 6,484,205 B1 | 11/2002 | Byford |
| 6,496,837 B1 | 12/2002 | Howard et al. |
| 6,516,312 B1 | 2/2003 | Kraft et al. |
| 6,686,938 B1 | 2/2004 | Jobs et al. |
| 6,691,301 B2 | 2/2004 | Bowen |
| 6,725,227 B1 | 4/2004 | Li |
| 6,784,900 B1 * | 8/2004 | Dobronsky et al. ............ 715/744 |
| 6,869,018 B2 | 3/2005 | Fifield |
| 6,925,609 B1 | 8/2005 | Lucke |
| 6,966,033 B1 | 11/2005 | Gasser et al. |
| 6,973,618 B2 | 12/2005 | Shaughnessy et al. |
| 7,010,755 B2 * | 3/2006 | Anderson et al. ............. 715/778 |
| 7,024,427 B2 | 4/2006 | Bobbitt et al. |
| 7,168,051 B2 | 1/2007 | Robinson et al. |
| 7,171,468 B2 | 1/2007 | Yeung et al. |
| 7,185,001 B1 | 2/2007 | Burdick et al. |
| 7,185,316 B1 | 2/2007 | Morris et al. |
| 7,191,195 B2 | 3/2007 | Koyama et al. |
| 7,191,422 B1 * | 3/2007 | Tourancheau et al. ........ 716/122 |
| 7,194,505 B2 | 3/2007 | Yano et al. |
| 7,409,644 B2 | 8/2008 | Moore et al. |
| 7,484,183 B2 | 1/2009 | Look et al. |
| 7,499,925 B2 | 3/2009 | Moore et al. |
| 7,512,586 B2 | 3/2009 | Kaasten et al. |
| 7,526,483 B2 | 4/2009 | Samji et al. |
| 7,536,386 B2 | 5/2009 | Samji et al. |
| 7,536,410 B2 | 5/2009 | Wong et al. |
| 7,555,722 B2 | 6/2009 | Karatal et al. |
| 7,587,411 B2 | 9/2009 | De Vorchik et al. |
| 7,590,625 B1 | 9/2009 | Tennican et al. |
| 7,614,016 B2 | 11/2009 | Wong et al. |
| 7,627,552 B2 | 12/2009 | Moore et al. |
| 7,650,575 B2 | 1/2010 | Cummins et al. |
| 7,692,807 B1 | 4/2010 | Sanders et al. |
| 7,769,752 B1 | 8/2010 | Turner et al. |
| 7,823,077 B2 | 10/2010 | Kurtz et al. |
| 7,853,890 B2 | 12/2010 | Miner et al. |
| 7,890,543 B2 | 2/2011 | Hunt et al. |
| 7,917,538 B2 | 3/2011 | Gurevich |
| 2001/0012439 A1 | 8/2001 | Young et al. |
| 2002/0049777 A1 | 4/2002 | Terayama et al. |
| 2002/0059288 A1 | 5/2002 | Yagi |
| 2002/0078035 A1 | 6/2002 | Frank et al. |
| 2002/0100039 A1 | 7/2002 | Iatropoulos et al. |
| 2002/0105548 A1 | 8/2002 | Hayton |
| 2002/0156792 A1 | 10/2002 | Gombocz |
| 2002/0180803 A1 | 12/2002 | Kaplan et al. |
| 2003/0050927 A1 | 3/2003 | Hussam |
| 2003/0065728 A1 | 4/2003 | Milovanovic |
| 2003/0069893 A1 | 4/2003 | Kanai et al. |
| 2003/0105747 A1 | 6/2003 | Ishida et al. |
| 2003/0110397 A1 | 6/2003 | Supramaniam et al. |
| 2003/0156119 A1 | 8/2003 | Bonadio |
| 2003/0158617 A1 | 8/2003 | Turpin et al. |
| 2003/0184580 A1 | 10/2003 | Kodosky et al. |
| 2004/0066410 A1 | 4/2004 | Lindhorst et al. |
| 2004/0085364 A1 | 5/2004 | Keely et al. |
| 2004/0111393 A1 | 6/2004 | Moore et al. |
| 2004/0146272 A1 | 7/2004 | Kessel et al. |
| 2004/0162838 A1 | 8/2004 | Murayama et al. |
| 2005/0066289 A1 | 3/2005 | Leah |
| 2005/0091612 A1 | 4/2005 | Stabb et al. |
| 2005/0102258 A1 | 5/2005 | Tecu et al. |
| 2005/0114330 A1 | 5/2005 | Chau |
| 2005/0131760 A1 | 6/2005 | Manning et al. |
| 2005/0188174 A1 | 8/2005 | Guzak et al. |
| 2005/0216825 A1 | 9/2005 | Teague |
| 2005/0216886 A1 | 9/2005 | Washburn |
| 2005/0240489 A1 | 10/2005 | Lambert |
| 2006/0143205 A1 | 6/2006 | Fuchs |
| 2006/0242591 A1 | 10/2006 | Van Dok et al. |
| 2006/0242604 A1 | 10/2006 | Wong et al. |
| 2007/0088672 A1 | 4/2007 | Kaasten et al. |
| 2007/0129977 A1 | 6/2007 | Forney |
| 2007/0130182 A1 | 6/2007 | Forney |
| 2008/0208927 A1 | 8/2008 | Chikusa et al. |

FOREIGN PATENT DOCUMENTS

| | | |
|---|---|---|
| JP | 8255066 | 12/1992 |
| JP | 20043262745 | 12/1992 |
| JP | 07129448 | 5/1995 |
| JP | 11212842 | 6/1999 |
| JP | 11212842 | 8/1999 |
| JP | 2000242655 | 9/2000 |
| JP | 2000348049 | 12/2000 |
| JP | 2004133796 | 10/2002 |
| JP | 2003067226 | 3/2003 |
| JP | 2004046870 | 2/2004 |
| NO | 20042743 A | 8/2004 |
| WO | 0167668 | 9/2001 |
| WO | 2004008348 A1 | 1/2004 |
| WO | 2004097638 | 11/2004 |

* cited by examiner

ADDRESS BAR USER INTERFACE CONTROL

CROSS-REFERENCE TO RELATED APPLICATION

This application is a continuation of prior U.S. application Ser. No. 11/111,973, filed Apr. 22, 2005, of which issued as U.S. Pat. No. 7,853,890 on Dec. 14, 2010; which is a continuation-in-part of prior U.S. application Ser. No. 10/420,040, filed Apr. 17, 2003, of which issued as U.S. Pat. No. 7,240,292 on Jul. 3, 2007, the entire contents of both which are incorporated herein by reference.

FIELD OF THE INVENTION

The present invention relates to graphical user interface controls and, in particular, to a graphical user interface control for navigating within a computer file system.

BACKGROUND OF THE INVENTION

As users navigate within a file system on a computer, a conventional graphical interface control, referred to as an address bar, shows the users where they are in the file system hierarchy. The conventional address bar shows the current location in terms of the file system's hierarchical structure of folders, subfolders, and files. Altering the user's location displayed in the conventional address bar is typically performed in one of two manners. The first is to manually edit the address in the address bar. Manually editing the address in the address bar permits a user to relocate to any number of locations in the file system hierarchy, but requires the user to have specific information regarding the organization of the file system on the computer, i.e., a specific file system location. The second method involves using external navigation tools which, when manipulated, update the address bar to reflect the new address or location. While bypassing the manual edit of the address in the address bar, manipulating external navigation tools still requires the user to have specific information concerning the organization of the file system and traverse the hierarchical structure. However, conventional address bars cannot reference files or data stored among multiple file system locations, such as folders or drives, due to a one-to one relationship between the address in the address bar and a specific location in the file system hierarchy.

The prior art lacks an address bar that allows users to specify addresses that display files stored among multiple file system locations. The prior art further lacks an address bar that also permits users to easily modify the address of the address bar without manually editing the address, or requiring specific knowledge concerning the organization of the underlying file system. Also lacking in the prior art is an address bar that presents alternative selections of files to the user from which the user may select to navigate to those selections of files. Such an address bar could also selectively present a conventional address bar interface to the user enabling the user to interact with the address bar according to previous experience according to user preferences.

SUMMARY OF THE INVENTION

An address bar for selecting content stored in a physical or virtual location is provided. The address bar may comprise a plurality of segments. Each segment may correspond to a filter or selection criteria for selecting stored content. A segment may include more than one filter or selection criteria, where the content corresponding to each of the filters or selection criteria in a segment may be represented. In this instance, a logical "or" operation referred to as "OR" filtering occurs where content corresponding to separate selection criteria from two or more different locations, whether virtual or physical, can be accessed. Collectively, the corresponding filters of the segments in the address bar represent an address for selecting content stored on a computer file system.

Each segment is an interactive segment that can respond to user interactions to modify the address of the address bar. Selecting a segment in the address bar causes those segments subsequent to the selected segment to be removed from the address bar.

According to one aspect, selecting a child control associated with a segment in the address bar causes a list of selectable child filters or selection criteria to be displayed to the user. The child filters or selection criteria are children of the filter(s) or selection criteria included with the segment. Selecting one of the child filters or selection criteria from the list of child filters or selection criteria causes the current (child) filter or selection criteria of the segment displayed in the address bar, if different from the selected child filter or selection criteria, to be replaced with the selected child filter or selection criteria. Additionally, those segments subsequent to the segment of the replaced child filter or selection criteria are removed from the address bar.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
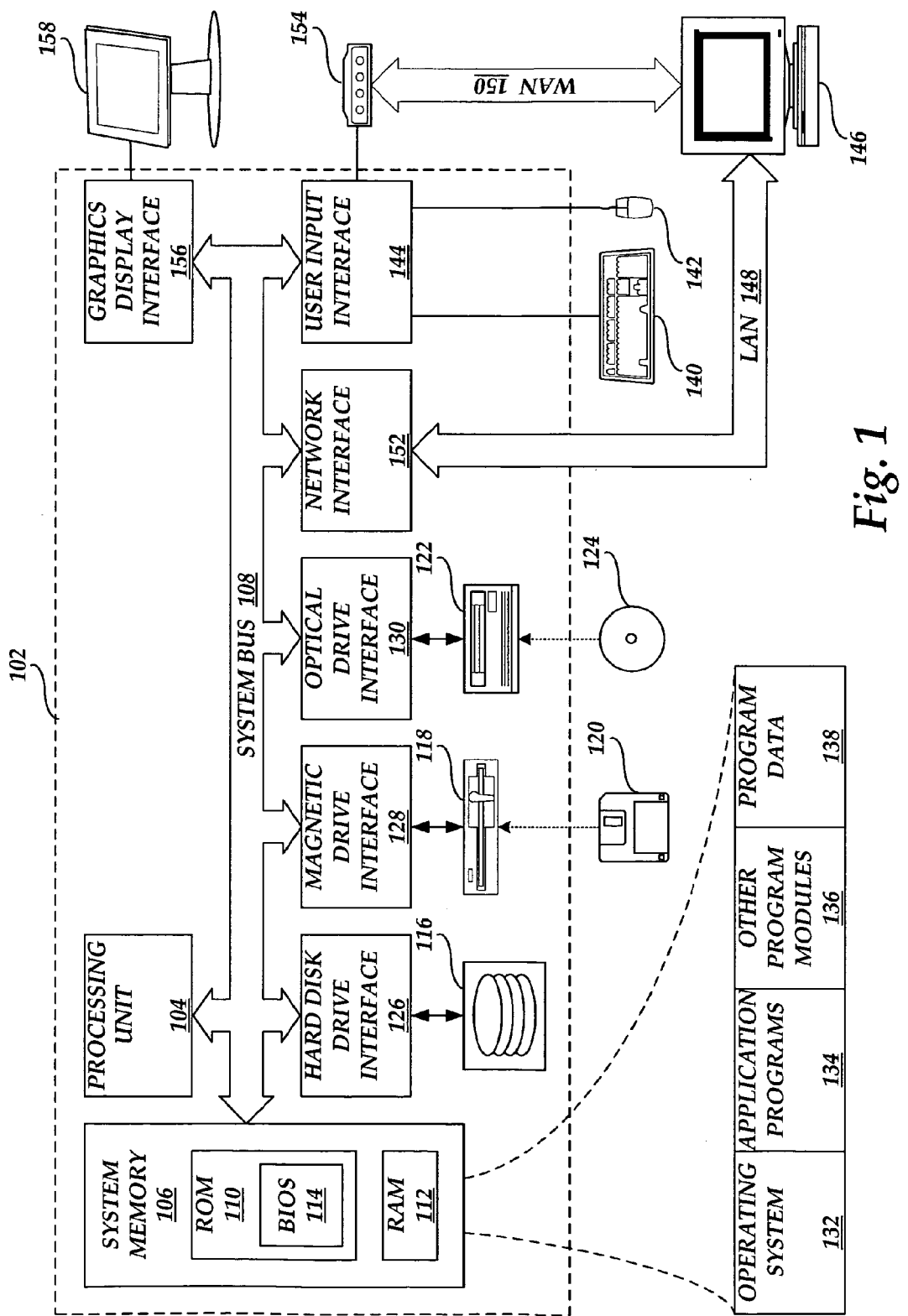
FIG. 1 is a block diagram of an exemplary computer system suitable for implementing the present invention.

FIG. 1 and the following discussion are intended to provide a brief, general description of a computing system suitable for implementing various features of the invention. While the computing system will be described in the general context of a personal computer usable in a distributed computing environment, where complementary tasks are performed by remote computing devices linked together through a communications network, those skilled in the art will appreciate that the invention may be practiced with many other computer system configurations, including multiprocessor systems, minicomputers, mainframe computers, and the like. The invention may be practiced in a local area network or, alternatively, on a single computer using logical, rather than physically remote, devices.

While aspects of the invention may be described in terms of application programs that run on an operating system in conjunction with a personal computer, those skilled in the art will recognize that those aspects also may be implemented in combination with other program modules. Generally, program modules include routines, programs, components, data structures, etc. that perform particular tasks or implement particular abstract data types.

With reference to FIG. 1, an exemplary system for implementing the invention includes a conventional personal computer 102, including a processing unit 104, a system memory 106, and a system bus 108 that couples the system memory to the processing unit 104. The system memory 106 includes read-only memory (ROM) 110 and random-access memory (RAM) 112. A basic input/output system 114 (BIOS), containing the basic routines that help to transfer information between elements within the personal computer 102, such as during startup, is stored in ROM 110. The personal computer 102 further includes a hard disk drive 116, a magnetic disk drive 118, e.g., to read from or write to a removable disk 120, and an optical disk drive 122, e.g., for reading a CD-ROM disk 124 or to read from or write to other optical media. The hard disk drive 116, magnetic disk drive 118, and optical disk drive 122 are connected to the system bus 108 by a hard disk drive interface 126, a magnetic disk drive interface 128, and an optical drive interface 130, respectively. The drives and their associated computer-readable media provide nonvolatile storage for the personal computer 102. Although the description of computer-readable media above refers to a hard disk, a removable magnetic disk, and a CD-ROM disk, it should be appreciated by those skilled in the art that other types of media that are readable by a computer, such as magnetic cassettes, flash memory cards, digital video disks, Bernoulli cartridges, ZIP disks, and the like may also be used in the exemplary operating environment.

A number of program modules may be stored in the drives and RAM 112, including an operating system 132, one or more application programs 134, other program modules 136, and program data 138. A user may enter commands and information into the personal computer 102 through input devices such as a keyboard 140 or a mouse 142. Other input devices (not shown) may include a microphone, touchpad, joystick, game pad, satellite dish, scanner, or the like. These and other input devices are often connected to the processing unit 104 through a user input interface 144 that is coupled to the system bus, but may be connected by other interfaces (not shown), such as a game port or a universal serial bus (USB). A display device 158 is also connected to the system bus 108 via a display subsystem that typically includes a graphics display interface 156 and a code module, sometimes referred to as a display driver, to interface with the graphics display interface. While illustrated as a stand-alone device, the display device 158 could be integrated into the housing of the personal computer 102. Furthermore, in other computing systems suitable for implementing the invention, such as a personal digital assistant (PDA), the display could be overlaid with a touch-screen. In addition to the elements illustrated in FIG. 1, personal computers also typically include other peripheral output devices (not shown), such as speakers or printers.

The personal computer 102 may operate in a networked environment using logical connections to one or more remote computers, such as a remote computer 146. The remote computer 146 may be a server, a router, a peer device, or other common network node, and typically includes many or all of the elements described relative to the personal computer 102. The logical connections depicted in FIG. 1 include a local area network (LAN) 148 and a wide area network (WAN) 150. Such networking environments are commonplace in offices, enterprise-wide computer networks, intranets, and the Internet.

When used in a LAN networking environment, the personal computer 102 is connected to the LAN 148 through a network interface 152. When used in a WAN networking environment, the personal computer 102 typically includes a modem 154 or other means for establishing communications over the WAN 150, such as the Internet. The modem 154, which may be internal or external, is connected to the system bus 108 via the user input interface 144. In a networked environment, program modules depicted relative to the personal computer 102, or portions thereof, may be stored in the remote memory storage device. It will be appreciated that the network connections shown are exemplary and other means of establishing a communications link between the computers may be used. In addition, the LAN 148 and WAN 150 may be used as a source of nonvolatile storage for the system.

Figure 2:
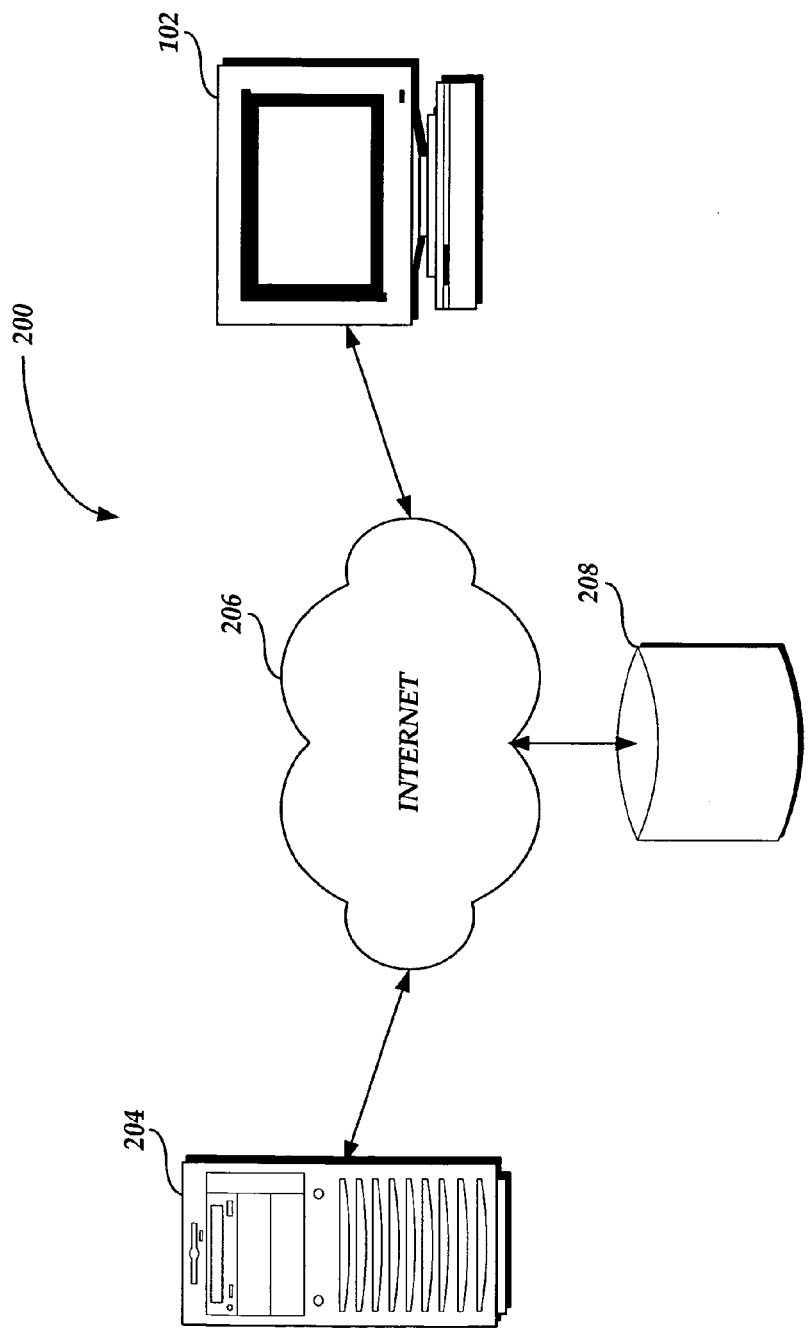
FIG. 2 is a pictorial diagram of an exemplary networked computer environment suitable for implementing the present invention.

FIG. 2 is a block diagram of an exemplary networked computing environment 200 suitable for operating the present invention. The exemplary networked computing environment 200 includes a computing device, such as the personal computer 102 described in regard to FIG. 1, for interacting with a user, and upon which the user may view files stored either locally or remotely to the computing device. While the following discussion describes the present invention in relation to a personal computer, it should be understood that the computing device 102 includes many types of physical devices including, but not limited to mini- and mainframe computers, PDAs, tablet computers, and other devices capable of interacting with a user and displaying files and content stored on the computing device and elsewhere.

The exemplary networked computing environment 200 may also include one or more remote servers, such as server 204 that stores files accessible to the computing device 102, and connected to the computing device via a communications network, such as the Internet 206, as shown in FIG. 2. In addition, the computing device 102 may also be connected to other information sources storing files or other content, such as a remote database 208. Those skilled in the art will recognize that files and information stored on both the remote server 204 and the remote database 208, as well as on local storage devices such as hard disk drive 166 (FIG. 1), may be accessible to, and displayable on, the computing device 102 as part of an integrated file system on the computing device. Additionally, while a particular configuration of a remote server 204 and remote database 208 is presented in FIG. 2, those skilled in the art will readily recognize that this particular configuration is for illustrative purposes only, and should not be construed as limiting upon the present invention.

Figure 3:
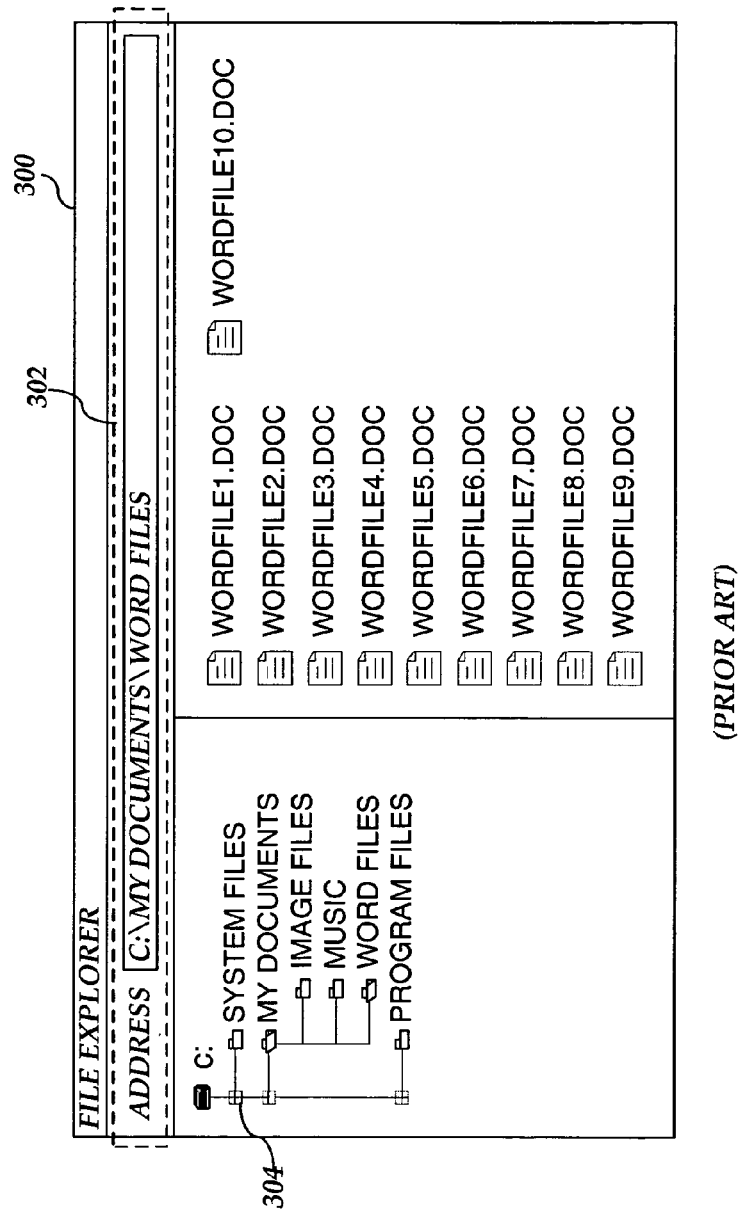
FIG. 3 is a pictorial diagram illustrating an exemplary file viewer having a conventional address bar associated with displaying files in a computer file system, as found in the prior art.

FIG. 3 illustrates an exemplary file viewer 300 having a conventional address bar 302 associated with displaying files in a computer file system, as found in the prior art. For purposes of the present discussion, a file viewer is a view or window on a display device, such as display device 158 (FIG. 1), for displaying files or other content to a user. A file viewer may be a window corresponding to an executable program specifically for displaying files to a user. Alternatively, a file viewer may be a view within an open or closed dialog box on an executable program that must save or retrieve data from a storage device connected locally or remotely to the computer system. It should be noted that the above examples of a file viewer are illustrative, and should not be construed as limiting upon the present invention.

An address in the conventional address bar 302 corresponds to a specific location in a file system. As previously described, in order to edit the address displayed in the conventional address bar 302, a user must modify the address according to specific knowledge of the file system. Alternatively, a user may select an entry in a tree view 304 to navigate to an alternative location. Those skilled in the art will recognize that other controls external to the address bar 302 may also be available that are not shown in the exemplary file view 300. While the address displayed in the conventional address bar 302 corresponds to a specific location in a file system, related files distributed among multiple folders in the file system cannot be displayed in conjunction with the conventional address bar 302.

Figure 4:
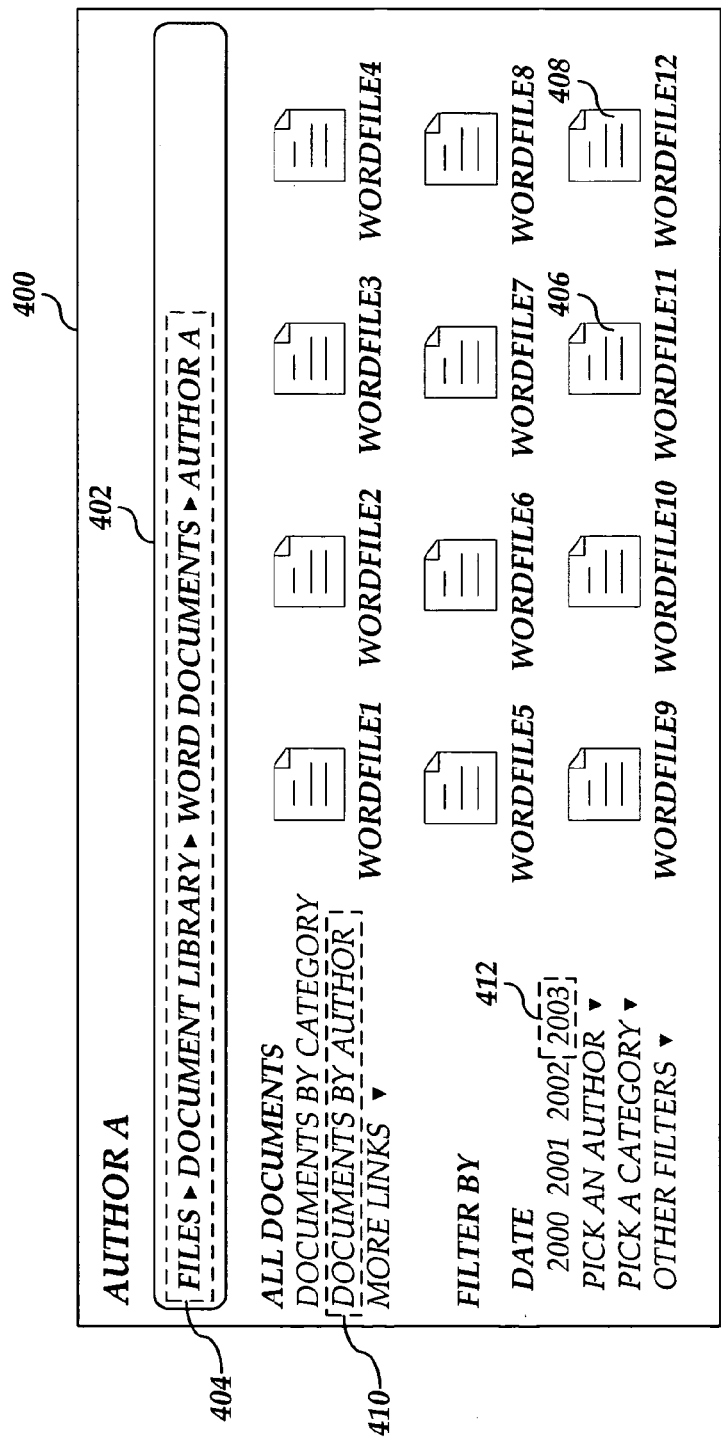
FIG. 4 is a pictorial diagram illustrating an exemplary file viewer for displaying files in a computer file system in accordance with a virtual address in a virtual address bar formed in accordance with the present invention.

FIG. 4 illustrates an exemplary file viewer 400 having a virtual address bar 402 associated with displaying files in a computer file system. The virtual address bar 402, having a virtual address 404, is configured to display similar information to that displayed by the conventional address 304 of the prior art file viewer 300 of FIG. 3. A virtual address, also referred to as a virtual path, references files stored in a computer file system according to selection criteria.

Similar to a conventional address, such as address 304 of FIG. 3, the virtual address's selection criteria may reference files stored in a specific location in the file system hierarchy. However, in contrast to a conventional address, the virtual address's selection criteria may also reference files irrespective of their specific file system location. Thus, a virtual address may reference files stored in multiple locations in a computer file system including physical and virtual locations. As shown in FIG. 4, the file viewer 400, according to the virtual address 404 in the virtual address bar 402, is able to display additional files, such as files 406 and 408, not found in the file viewer 300 of FIG. 3. Additionally, the virtual address bar 402 may also be utilized to display content other than files in a computer file system. For example, the virtual address bar 402 may be used to reference content including system devices, system services, or Internet locations.

Figure 5A:
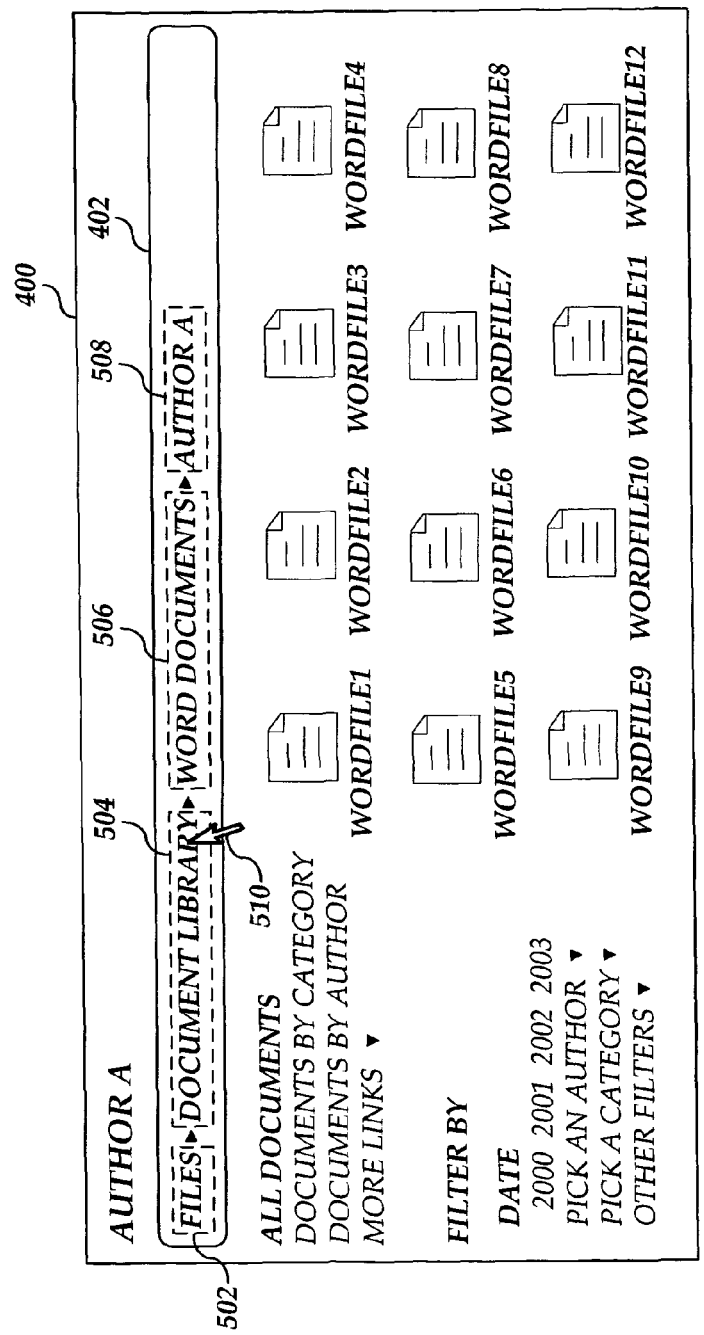
FIG. 5A is a pictorial diagram of the exemplary file viewer of FIG. 4 illustrating selecting a segment of the virtual address in the virtual address bar to navigate in the file system.

FIG. 5A illustrates manipulating a segment of the virtual address 404 in the virtual address bar 402 in order to navigate in a computer file system. Each virtual address bar, such as virtual address bar 402, is comprised of one or more interactive segments, such as segments 502, 504, 506, and 508. Each segment in a virtual address bar may correspond to one or more predetermined filters, or selection criteria, on all of the available content or files accessible to a computer file system. Collectively, the filters of all of the segments in a virtual address bar 402 represent the virtual address bar's virtual address.

The first segment in a virtual address bar, such as segment 502, is referred to as a root segment, or root filter. The root segment represents the broadest category of content available for selection by the virtual address bar 402. For example, segment 502 "Files" would likely represent a filter that references all files accessible to the computer file system. Alternatively, a root segment may represent a filter that references all system services available to the user on the computer system, or a filter that references all hardware devices installed in the computer system. Those skilled in the art will recognize that numerous other alternative root filters may be utilized by the present invention. Thus, the above described examples are given for illustrative purposes, and should not be construed as limiting upon the present invention. Additionally, the labels displayed for each segment, such as "Files" on the root segment 502, are illustrative and should not be construed as limiting upon the present invention. According to one illustrative embodiment, a label displayed on a segment is user configurable.

Each additional segment in a virtual address bar 402, such as segments 504, 506, and 508, represent additional filters to be applied when selecting and displaying files or content in a file viewer 400. For example, root segment 502 "Files" references all files available to the computer system. Segment 504 "Document Library" filters the files selected by the root segment 502, by selecting those files that were generated as documents by the user, such as through a word processor, spreadsheet, or some other document generating application. Segment 506 "Word Documents" filters the files selected by segment 504 according to those documents that were generated using a word processor, such as Microsoft Corporation's Word application. Finally, segment 508 "Author A" filters the word processing documents selected by segment 506 according to whether they were authored by "Author A." Thus, content selected according to the virtual address represented in the virtual address bar 402 must satisfy the filters corresponding to all of the segments in the virtual address bar.

Segments in the virtual address bar 402 are generally ordered from those filters that are most inclusive, to those filters that are least inclusive. For example, as previously discussed, segment 502 "Files" is the broadest and most inclusive. Segments 506 "Word Documents" and segment 508 "Author A" are less inclusive. The virtual address bar 402 illustrates the ordering of segments from left to right, and, for purposes of the present discussion, segments 504, 506, and 508 are subsequent to the root segment 502. However, it should be understood that other orientations are possible, such as a top-down arrangement, without departing from the scope of the invention. Thus, the orientation from left to right should be viewed as illustrative, and not construed as limiting on the present invention.

As previously mentioned, segments in a virtual address bar 402, such as segments 502, 504, 506, and 508, do not necessarily correspond to specific locations in a computer file system, such as folders, drives, and directories. Thus, segment 504 "Document Library" may reference files or content distributed on multiple servers, drives, or folders/directories. However, certain segments in a virtual address bar 402 may reference specific locations with a computer file system hierarchy. A further discussion of virtual address segments referencing specific file system locations is given below in regard to FIGS. 9A and 9B.

In contrast to a conventional address bar, each segment in a virtual address bar 402 represents an actionable, interactive user interface element. For example, a segment in a virtual address bar 402 is responsive to user selection, monitors whether a cursor is located over the segment for a specific period of time, and may be removed from the virtual address bar by a dragging user interaction. Hence, as shown in FIG. 5A, a user may place a cursor 510 over a segment in the virtual address bar 402, such as segment 504 "Document Library," to select, or click, on that segment in order to navigate to that level, i.e., truncate the virtual address at that segment, as described in regard to FIG. 5B.

Figure 5B:
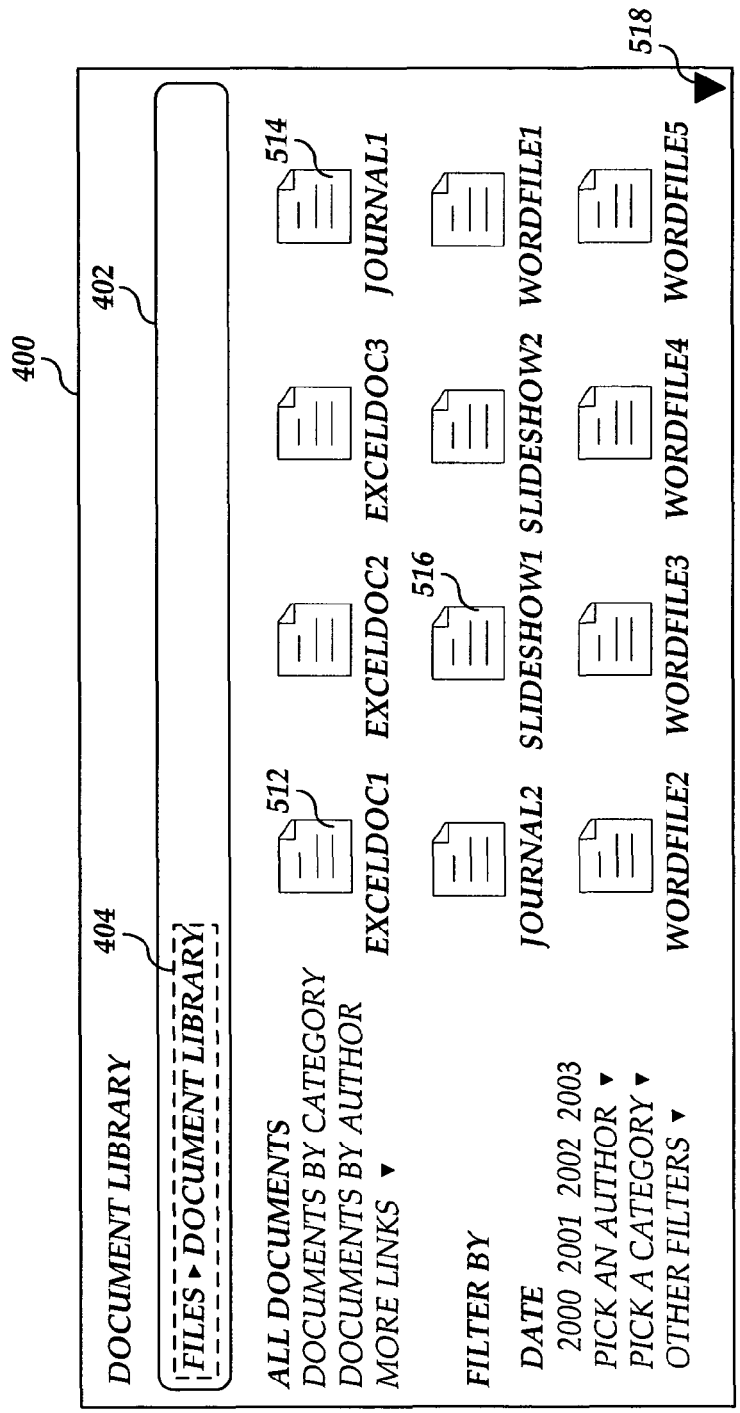
FIG. 5B is a pictorial diagram of the exemplary file viewer of FIG. 5A illustrating the results of selecting a segment of the virtual address in the virtual address bar.

FIG. 5B illustrates the results of selecting a segment 504 in the virtual address bar 402. By clicking on the segment 504 in the virtual address bar 402, the user is indicating a desire to navigate to that level in the virtual address. In effect, the user is trimming off those filters subsequent to the selected segment. For example, by clicking on segment 504 "Document Library" (FIG. 5A), the resulting virtual address 404 no longer contains segments 506 "Word Documents" and 508 "Author A" (FIG. 5A). Additionally, because the user has navigated to a less restrictive set of filters, the resulting virtual address 404 in the virtual address bar 402 is more inclusive. This is indicated by the addition of documents in the file viewer 400 of FIG. 5B not previously found in the file viewer 400 of FIG. 5A, including document 512, document 514, and document 516, and by the presence of a scroll button 518 indicating that additional files may be viewed that cannot be displayed in the file viewer 400 (FIG. 5B) due to space limitations.

Figure 5C:
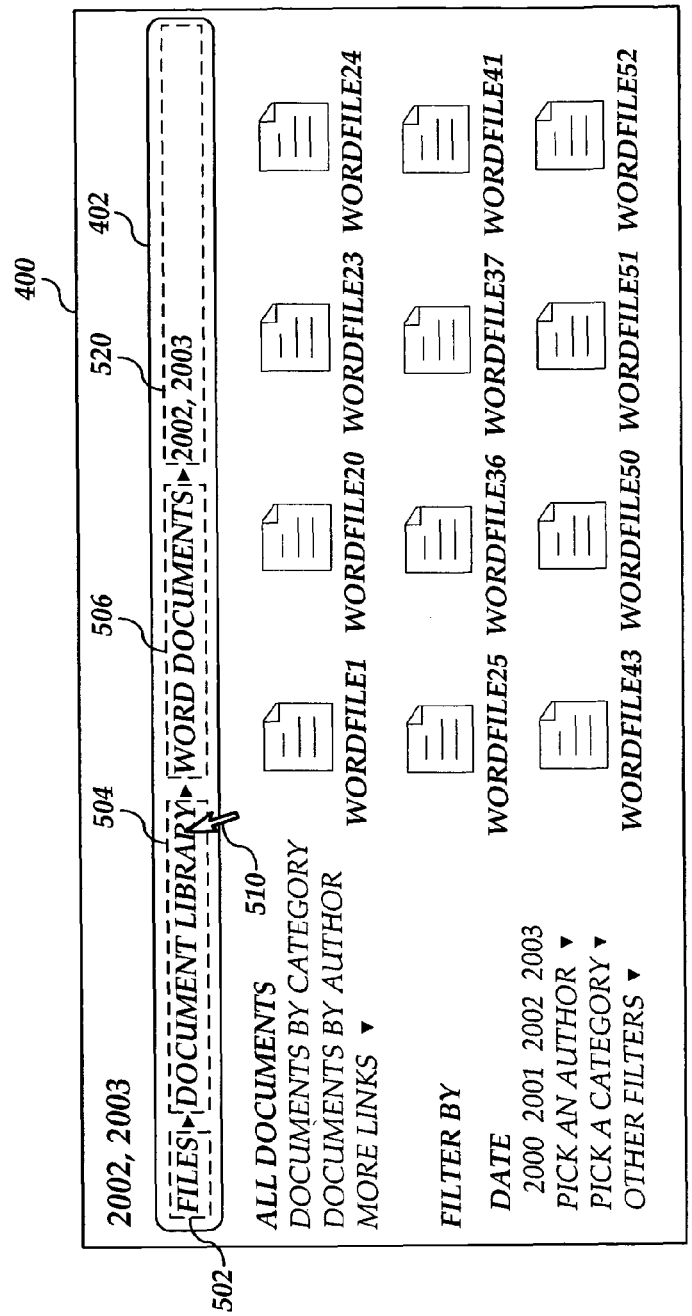
FIG. 5C is a pictorial diagram illustrating an exemplary file viewer for displaying files in a computer file system in which a segment of the virtual address includes more than one filter.

FIG. 5C is similar to FIG. 5A, but replaces segment 508 with segment 520. Segment 520 includes two filters or selection criteria, "2002" and "2003", which are logically combined to produce the results displayed in the file viewer 400. The "," between the two filters or selection criteria serves as a logical operand. It will be understood that Boolean operators such as AND, OR, NOT, NAND, NOR, XOR, etc. may be applied. In the present implementation, the "," serves as an "OR" operator so items which satisfy all the preceding filters or selection criteria (Files, Document Library, Word Documents) and which either were created in "2002" or were created in "2003" satisfy the logical expression and are presented in the file viewer 400. The two filters or selection criteria may identify items in virtual or physical locations. For example, one filter or selection criteria may identify items in a physical location, while the other may identify items in a virtual location. Any number of filters or selection criteria may be logically combined in a single segment, but for practical purposes, it would better to limit the number combined to a number which can be displayed together on the address bar to minimize user confusion. While logically combining filters or selection criteria across properties is within the scope of the invention, it would be preferable to logically combine filters or selection criteria within the same property for organizational purposes and to avoid potential user confusion.

It will be appreciated that a logical combination of filters or selection criteria may occur within one or more segments in the address bar. If a segment were added to succeed segment 520 in FIG. 5C, for example with filter "Author A", then the items displayed in the file viewer would be further narrowed to word documents created in "2002" or in "2003", which were authored by A. Selecting the segment Document Library from FIG. 5C results in the file viewer 400 shown in FIG. 5B, in which the segments "Word Documents" and "2002, 2003" have been removed and the files which meet the filter "Document Library" are presented.

In addition to selecting segments in a virtual address bar to navigate to a less restrictive segment, a user may also wish to navigate to, or select peer filters of current segments in a virtual address. A peer filter is an alternative filter that may be selected and applied to a given segment in the virtual address bar. For example, with reference to FIG. 5A, peer filters for segment 506 "Word Documents" may include filters such as "Excel Documents," "Journals," and the like. Other types of filters, including specific file system locations, hardware devices, or computer services, may also be applied to a given segment in the virtual address bar. Peer filters may or may not be logically related to a given segment's current filter. Each segment in a virtual address bar may have peer filters. Selecting a peer filter of a segment in a virtual address bar is sometimes referred to as navigating laterally. Selecting peer filters of segments in a virtual address bar is described below in regard to FIGS. 6A-6D, and also in regard to FIG. 10.

Figure 6A:
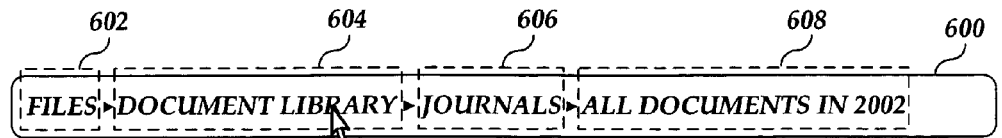
FIGS. 6A-6D are pictorial diagrams illustrating selecting a peer filter associated with a segment of a virtual address in a virtual address bar.

FIGS. 6A-6D are pictorial diagrams illustrating selecting a peer filter associated with a segment of virtual address in a virtual address bar 600. As shown in FIG. 6A, virtual address bar 600 has a virtual address comprising multiple segments, segments 602-608. In order to select a peer filter for a given interactive segment in a virtual address bar 600, a user must make an alternative selection, or alternative manipulation, of that interactive segment. One way to make an alternative selection is to right click on a given segment. Right clicking is known in the art and refers to using a secondary button on a mouse, or other input device, where the secondary button is typically on the right-hand side of the mouse. Alternatively, because an interactive segment can monitor when a cursor is located over it, an alternative selection may be made by locating the cursor over an interactive segment and leaving the cursor in place for predetermined amount of time, sometimes referred to as hovering. However, while the present discussion describes alternatives for causing peer filters to be displayed, they are for illustration, and should not be construed as limiting upon the present invention. Those skilled in the art will recognize that there are numerous alternatives for generating an alternative selection.

Figure 6B:
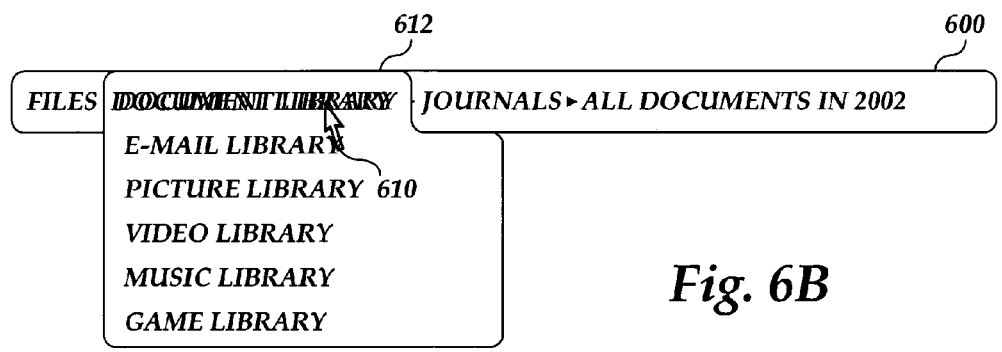

To illustrate alternatively selecting a segment, with reference to FIG. 6A, a user first places the cursor 610 over segment 604 "Document Library" for a predetermined amount of time, i.e., hovers over the segment, to select that segment. FIG. 6B demonstrates the results of alternatively selecting segment 604 "Document Library" in the virtual address bar 600. As shown in FIG. 6B, after alternatively selecting segment 604 "Document Library," a peer filter view 612 is displayed including peer filters corresponding to the selected segment. It should be understood that the peer filters presented in the peer filter view 612 are for illustrative purposes only, and should not be construed as limiting upon the present invention.

Figure 6C:
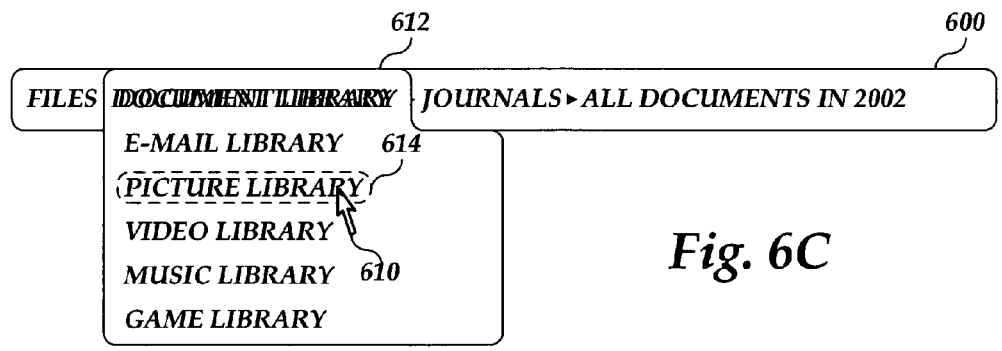
Figure 6D:
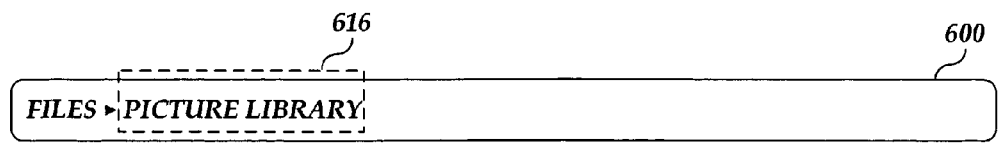

In order to select an alternative peer filter, as shown in FIG. 6C, the user positions the cursor 610 over one of the filters presented in the peer filter view 612, such as peer filter 614, and selects the peer filter. As shown in FIG. 6D, after selecting the alternative peer filter 614, the previously selected segment 604 (FIG. 6A) is replaced with a new segment 616 representing the selected alternative peer filter 614. Additionally, those segments that followed the alternatively selected segment 604 in the virtual address bar 600 of FIG. 6A, specifically segments 606 "Journals" and 608 "All Documents in 2002", are removed from the virtual address bar 600 in FIG. 6D. Although not shown, it follows that any files or content previously selected according to segments 604 "Document Library", 606 "Journals", and 608 "All Documents In 2002" would no longer be displayed in a corresponding file viewer, and only those files or content selected according to segments 602 "Files" and 616 "Picture Library" would be displayed.

In accordance with another aspect of the invention, a user may also wish to navigate to, or select, child filters or selection criteria of current segments in a virtual address. In a file tree structure, a parent node (or parent filter) has children represented by child nodes. Each child node is a child filter or selection criteria and further restricts the parent node or parent filter or selection criteria. Each segment in a virtual address bar may have child filters or selection criteria. In FIG. 5A, segment 504 is the child of segment 502. Selecting child filters or selection criteria of segments in a virtual address bar is described below in regard to FIGS. 13A-13D, and also in regard to FIG. 12.

Figure 13A:
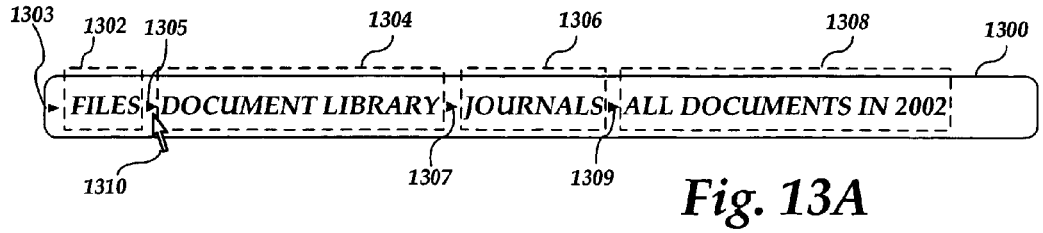
FIGS. 13A-13D are pictorial diagrams illustrating selecting a child filter associated with a segment of a virtual address in a virtual address bar.

FIGS. 13A-13D are pictorial diagrams illustrating selecting a child filter or selection criteria associated with a segment of virtual address in a virtual address bar 1300. As shown in FIG. 13A, virtual address bar 1300 has a virtual address comprising multiple segments, segments 1302-1308. In order to select a child filter or selection criteria for a given interactive segment in a virtual address bar 1300, a user may select a child control associated with the given interactive segments. Child controls 1303, 1305, 1307 and 1309 are associated with interactive segments 1302, 1304, 1306 and 1308, respectively. It will be appreciated that each segment and its associated child control may form a split button.

Figure 13B:
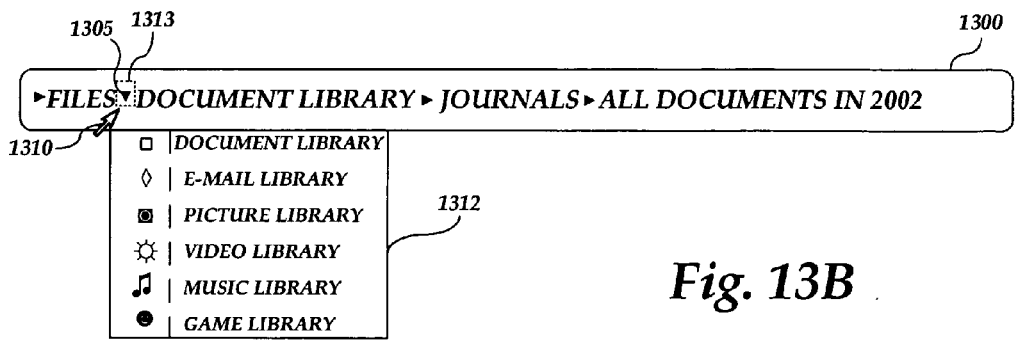

An example of selecting a child filter or selection criteria will be described in connection with FIGS. 13B-13D. To select a child filter or selection criteria, with reference to FIG. 13A, a user first places the cursor 1310 over the child control 1305 for a predetermined amount of time, i.e., hovers over the control, to select the child control. Other selection operations are possible as well such as selecting the control by performing a left click operation on the child control 1305. FIG. 13B demonstrates the results of selecting the child control 1305 associated with the segment "Files" in the virtual address bar 1300. As shown in FIG. 13B, after selecting the child control 1305, a child view 1312 is displayed including a list of child filters or selection criteria for the corresponding interactive segment 1302 and the corresponding icon for the child filter or selection criteria. The icon may identify a particular type for the child filter or selection criteria, such as whether it represents a virtual or physical location and the particular type of virtual or physical location. In this example of the child view, a split menu is shown with the icons in the left hand column and the child filters or selection criteria in the right hand column of the child view. It should be understood that the child filters or selection criteria presented in the child view 1312 and the icons are for illustrative purposes only, and should not be construed as limiting upon the present invention. Also, it should be appreciated that the icons may be displayed adjacent to any address type whether or not part of a child view, peer view or otherwise.

Figure 13C:
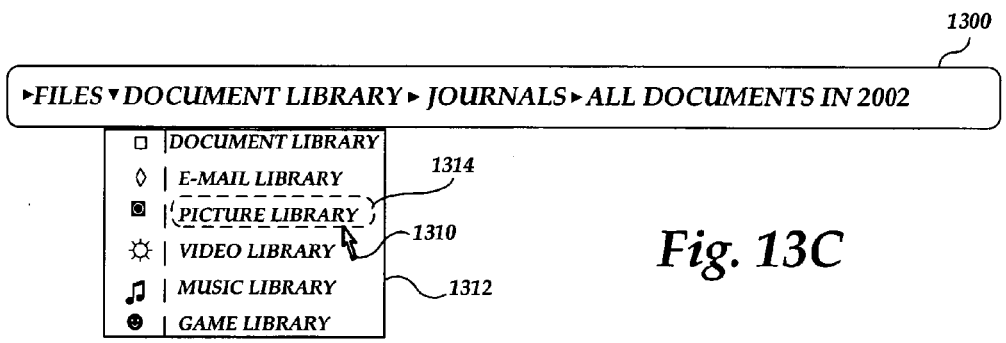
Figure 13D:
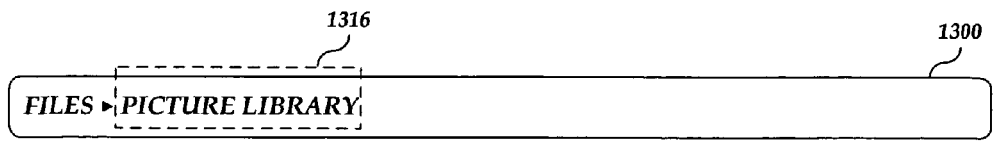

In order to select a child filter or selection criteria, as shown in FIG. 13C, the user positions the cursor 1310 over one of the child filters or selection criteria presented in the child view 1312, such as child filter or selection criteria 1314, and selects the child filter or selection criteria 1314. As shown in FIG. 13D, after selecting the child filter or selection criteria 1314, the segment 1304 succeeding the parent segment 1302 associated with the child control 1305 (FIG. 13A) is replaced with a new segment 1316 representing the selected child filter or selection criteria 1314. Additionally, those segments that followed the segment 1304 in the virtual address bar 1300 of FIG. 13A, specifically segments 1306 "Journals" and 1308 "All Documents in 2002", are removed from the virtual address bar 1300 in FIG. 13D. Although not shown, it follows that any files or content previously selected according to segments 1304 "Document Library", 1306 "Journals", and 1308 "All Documents In 2002" would no longer be displayed in a corresponding file viewer, and only those files or content selected according to segments 1302 "Files" and 1316 "Picture Library" would be displayed.

Segments may be added to a virtual address in a virtual address bar through various user interactions at the end of the existing segments. To add a filter to a virtual address in a virtual address bar, a user may manipulate an actionable control associated with a particular filter found on a window, or file viewer with the virtual address bar. For example, with reference to the file viewer 400 of FIG. 4, a user may click on the actionable control 412 "2003" to add a corresponding filter to the virtual address 404 in the virtual address bar 402. Alternatively (not shown), a user may manually enter in a known filter at the end of the virtual address by typing the filter's name. Numerous other ways of adding a filter to a virtual address exist, all of which are contemplated as falling within the scope of the present invention. Thus, it should be understood that the above examples are for illustration purposes, and should not be construed as limiting upon the present invention.

When a filter is added to a virtual address in a virtual address bar, a process is undertaken to ensure that the newly added filter does not conflict with any filters currently existing as part of the virtual address. If the newly added filter conflicts with an existing filter, the existing filter is removed. A newly added filter conflicts with an existing filter in a virtual address if the newly added filter varies from the breadth of the existing filter, being either more or less broad than the existing filter. Additionally, a newly added filter conflicts with an existing filter if the newly added filter is mutually exclusive to the existing filter. However, a newly added filter that is equivalent to an existing filter is not added because it has no effect. It should be understood that the above description of conflicts is given for illustration purposes, and should not be construed as limiting upon the present invention. Those skilled in the art will recognize that other conflicts between filters may exist that are contemplated as falling within the scope of the present invention.

Figure 7A:
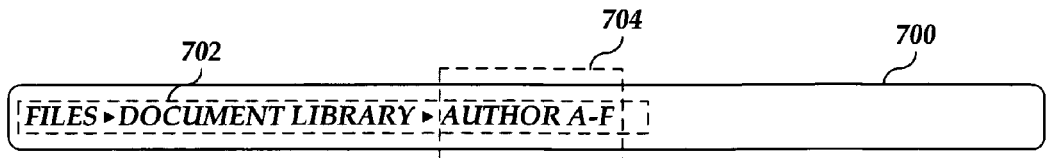
FIGS. 7A-7D are pictorial diagrams illustrating adding additional filters to a virtual address in a virtual address bar.
Figure 7B:
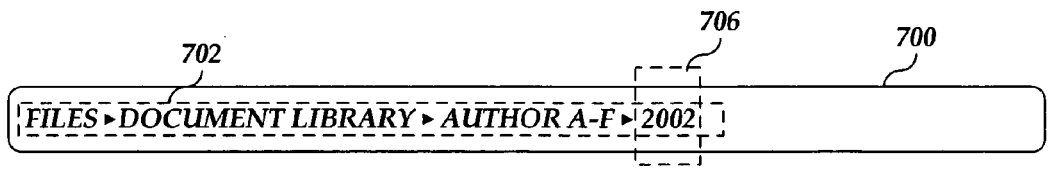

FIGS. 7A-7D are pictorial diagrams illustrating adding filters to a virtual address 702 in a virtual address bar 700, and removing conflicting existing filters. FIG. 7A illustrates an exemplary virtual address 702 displayed in a virtual address bar 700. As shown in FIG. 7B, a new filter, represented by segment 706 "2002", is added to the virtual address 702. As previously described, new filters are added to the end of the virtual address, as indicated by placing segment 706 "2002" at the end of the segments in the virtual address bar 700 of FIG. 7B. Thereafter, the process undertaken for adding segment 706 "2002" determines that the added filter does not conflict with any current filters in the virtual address 702. Thus, no existing filters are removed from the virtual address 702.

Figure 7C:
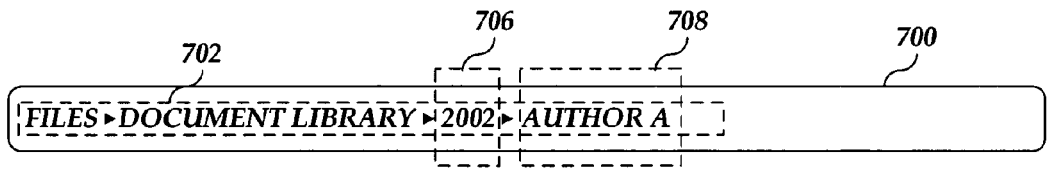

As shown in FIG. 7C, another filter is added to the virtual address 702, represented by segment 708 "Author A." The process undertaken for adding this new filter determines that the new filter, "Author A," would conflict with the filter represented by segment 704 "Author A-F" because the new filter, "Author A," is narrower than the existing filter. Accordingly, segment 704 "Author A-F" is removed from the virtual address bar 700, and segment 708 "Author A" is added to the end of the segments in the virtual address bar.

Figure 7D:
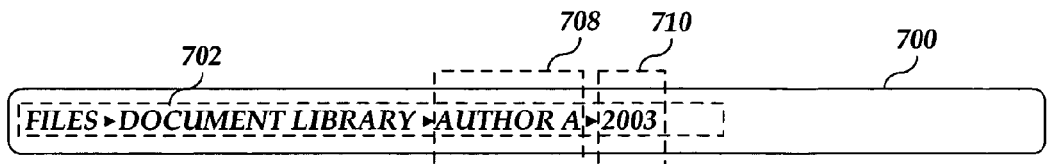

FIG. 7D illustrates the results of adding segment 710 "2003" to the virtual address bar 700 of FIG. 7C. Filters in a virtual address 702 are restrictive, not cumulative. Each filter further restricts the selected content. Thus, mutually exclusive filters would prevent the virtual address 702 from selecting any files or content, and therefore, create a conflict. As illustrated in FIG. 7D, segment 706 "2002" (FIG. 7C) is removed from the virtual address bar 700 because of a conflict as it is mutually exclusive with the newly added segment 710 "2003."

Figure 8A:
FIGS. 8A and 8B are pictorial diagrams illustrating an exemplary virtual address bar displaying a virtual address where the virtual address exceeds the virtual address bar's display capacity.
Figure 8B:

When a virtual address bar, such as virtual address bar 800 (FIG. 8A), cannot completely display the virtual address due to size limitations of the virtual address bar, a portion of the virtual address is displayed according to the size of the virtual address bar. However, the undisplayed portions of the virtual address may still be accessed by the user. More specifically, the virtual address bar displays actionable visual indicators to scroll the virtual path within the virtual address bar. FIGS. 8A and 8B illustrate an exemplary virtual address bar 800 displaying a virtual address where the virtual address exceeds the virtual address bar's display capacity. As shown in FIGS. 8A and 8B, scroll icons 802 and 804 indicate the direction the virtual address bar 800 may scroll in order to display the previously undisplayed portions of the virtual address. However, while the illustrative diagrams demonstrate the use of scroll icons, it is for illustrative purposes only, and should not be construed as limiting on the present invention. Those skilled in the art will recognize that there are numerous other ways of scrolling the virtual address in a virtual address bar, all of which are contemplated as falling within the scope of the present invention.

Figure 8C:
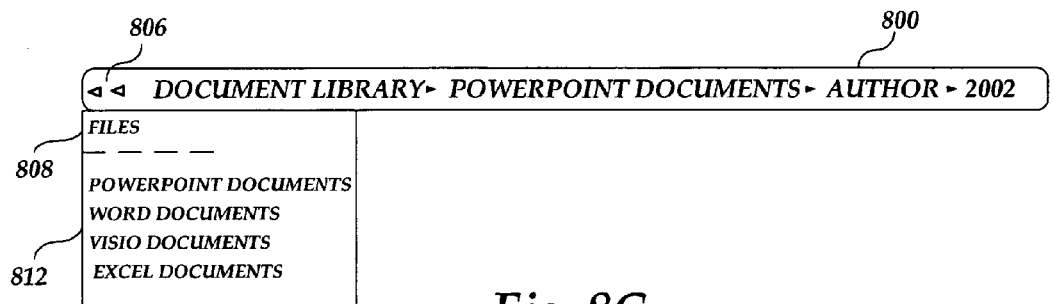
FIG. 8C is a pictorial diagram illustrating an exemplary virtual address bar displaying a virtual address in an overflow condition according to one aspect of the present invention.

According to another aspect, if an overflow condition occurs such that the address bar is too small to fit all the interactive segments that comprise the address, the interactive segments displayed are the most specific. For instance with reference to FIG. 8C, the broader interactive segment FILES is not included while the most specific interactive segments are displayed on the virtual address bar 800. The chevron 806 serves as an overflow indicator to indicate that the adjacent interactive segment DOCUMENT LIBRARY has ancestors that are not displayed. The chevron 806 has dual roles in that it also serves as a child control as well as an overflow indicator. As shown in FIG. 8C, the selection of the chevron 806 provides the child filter or selection criteria list including filters POWERPOINT DOCUMENTS, WORD DOCUMENTS, VISIO DOCUMENTS and EXCEL DOCUMENTS for the interactive segment DOCUMENT LIBRARY and also displays an ancestor list 808 for the interactive segment DOCUMENT LIBRARY including the ancestor FILES. Selection of an ancestor filter or child filter from the ancestor or child filter lists results in the address bar being modified to display that filter and remove all subsequent filters. It will be appreciated that the chevron 806 could serve as a control for displaying an ancestor list and an independent child control may exist.

Figure 9A:
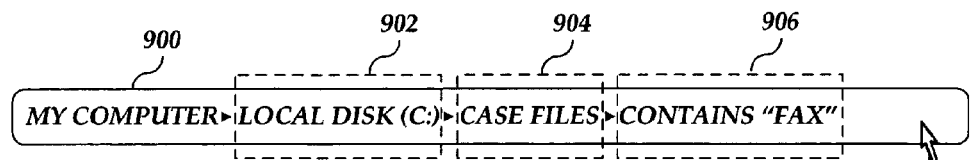
FIG. 9A is a pictorial diagram illustrating an exemplary virtual address bar having a virtual address with filters referencing both virtual and actual locations in a file system.

FIG. 9A is a block diagram illustrating a virtual address bar 900 having segments referencing both virtual and actual locations in a file system. As previously discussed, a virtual address in a virtual address bar 900 may contain segments referencing specific locations within a computer file system hierarchy, and also contain segments referencing virtual, or logical, locations within a computer file system. Files or content referenced by a virtual segment may be distributed among many physical locations. A virtual address bar 900 may contain segments referencing physical locations and segments referencing virtual locations. For example, virtual address bar 900 includes segment 902 "Local Disk (C:)" referring to files or content contained in a specific area in the computer file system, in particular drive "C." Alternatively, segment 904 "Case Files" of itself refers to files or content stored in multiple folders in the computer file system hierarchy associated with case files. However, in combination with segment 902 "Local Disk (C:)", segment 904 "Case Files" references only those case files found on local drive "C." Additionally, segment 906 "Contains 'Fax'" further filters the files on local disk C: and associated with the case files according to whether they contain the word "Fax."

Figure 9B:
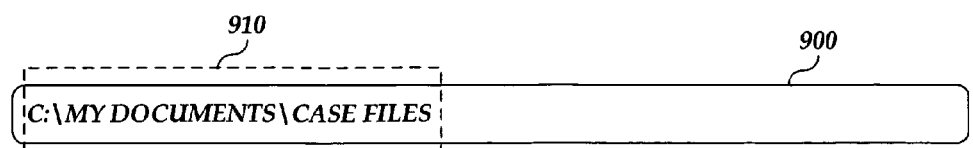
FIG. 9B is a pictorial diagram illustrating the exemplary virtual address bar of FIG. 9A as configured to display a conventional address bar.

As shown in FIG. 9B, a virtual address bar 900 may be configured to function as a conventional address bar. For example, with reference to FIG. 9A, by placing a cursor 908 in the empty space of the virtual address bar 900 and clicking there, the virtual address bar 900 switches from displaying segments representing a virtual address, to functioning as a conventional address bar displaying a conventional address 910, as shown in FIG. 9B. The conventional address 910 in the virtual address bar 900 of FIG. 9B approximates the virtual address displayed in the virtual address bar 900 of FIG. 9A. However, those filters in the virtual address bar 900 of FIG. 9A that do not correspond to physical locations in a computer file system cannot be displayed and are removed from the conventional address 910. Specifically, segment 904 "Case Files" and segment 906 "Contains 'Fax'" are not part of the conventional address 910 (FIG. 9B).

In order to reconfigure a virtual address bar 900, functioning as a conventional address bar, to function normally as a virtual address bar, the user must so indicate in a manner other than clicking on the empty area of the bar. When configured to function as a conventional address bar, a virtual address bar must permit the user to click in the empty area for address editing purposes. Clicking in the empty area of a conventional address bar places an editing cursor at the end of the address/path for editing purposes. Accordingly, to reconfigure the virtual address to again function in its normal manner as described above, a user must press a predefined key or key sequence, such as the Esc or Tab key, or by place the focus on another area of a window or view by clicking on another area of the window or view. Those skilled in the art will recognize that other user actions may also be utilized to reconfigure the virtual address bar 900 to again function in its normal mode as described above, all of which are contemplated as falling within the scope of the present invention.

Figure 10:
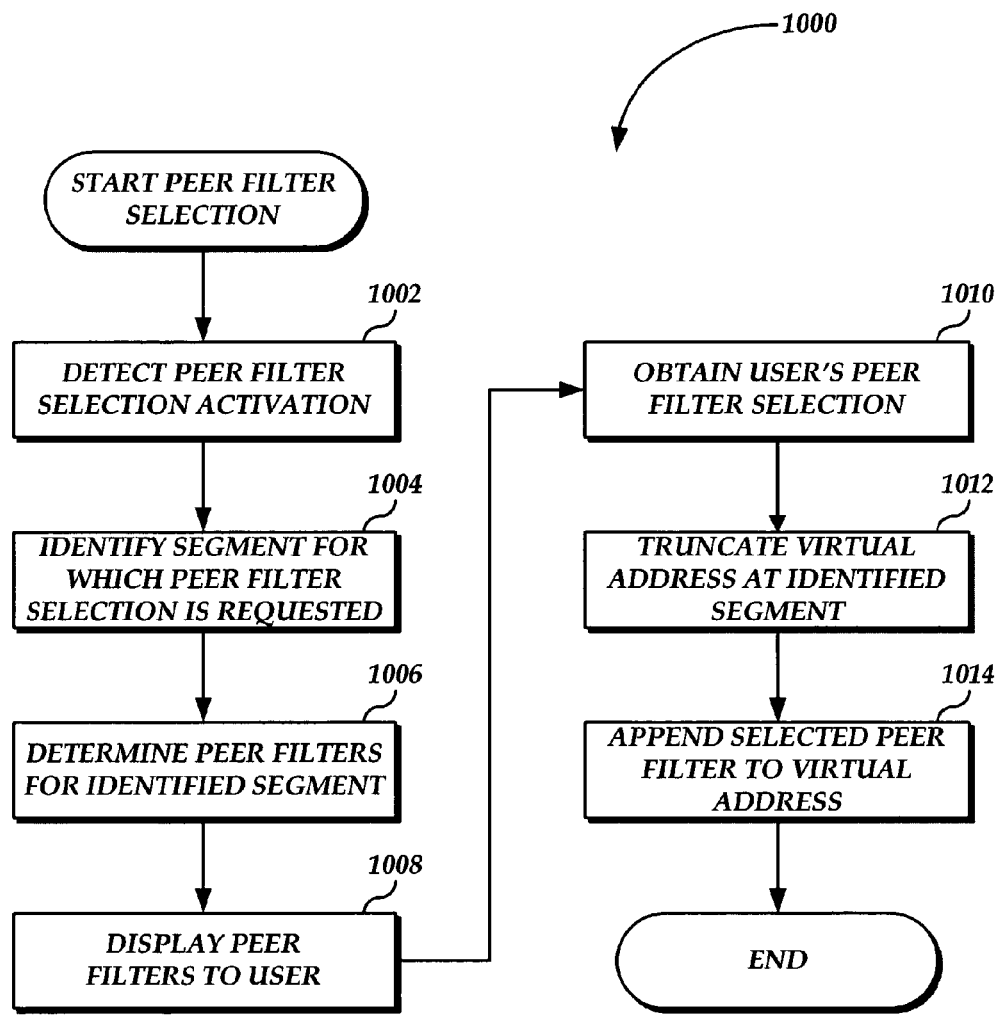
FIG. 10 is a flow diagram illustrative of an alternate filter selection routine for selecting alternate filters in a virtual address bar.

FIG. 10 is a flow diagram illustrative of a peer filter selection routine 1000 for selecting a peer filter for an identified segment in a virtual address bar. Beginning at block 1002, the routine 1000 detects a peer filter selection activation. Activating the peer filter selection process is described above in regard to FIGS. 6A-6D. At block 1004, the segment for which the peer filter selection has been requested is identified. At block 1006, the peer filters for the identified segment are determined from a predetermined list of peer filters. At block 1008, the peer filters are displayed to the user. At block 1010, the user's peer filter selection from peer filters displayed is obtained. At block 1012, the virtual address is truncated by removing the identified segment from the virtual address bar, and any additional segments that follow the identified segment. At block 1014, a segment representing the selected peer filter is appended to the remaining segments in the virtual address bar. Thereafter, the routine 1000 terminates.

Figure 11:
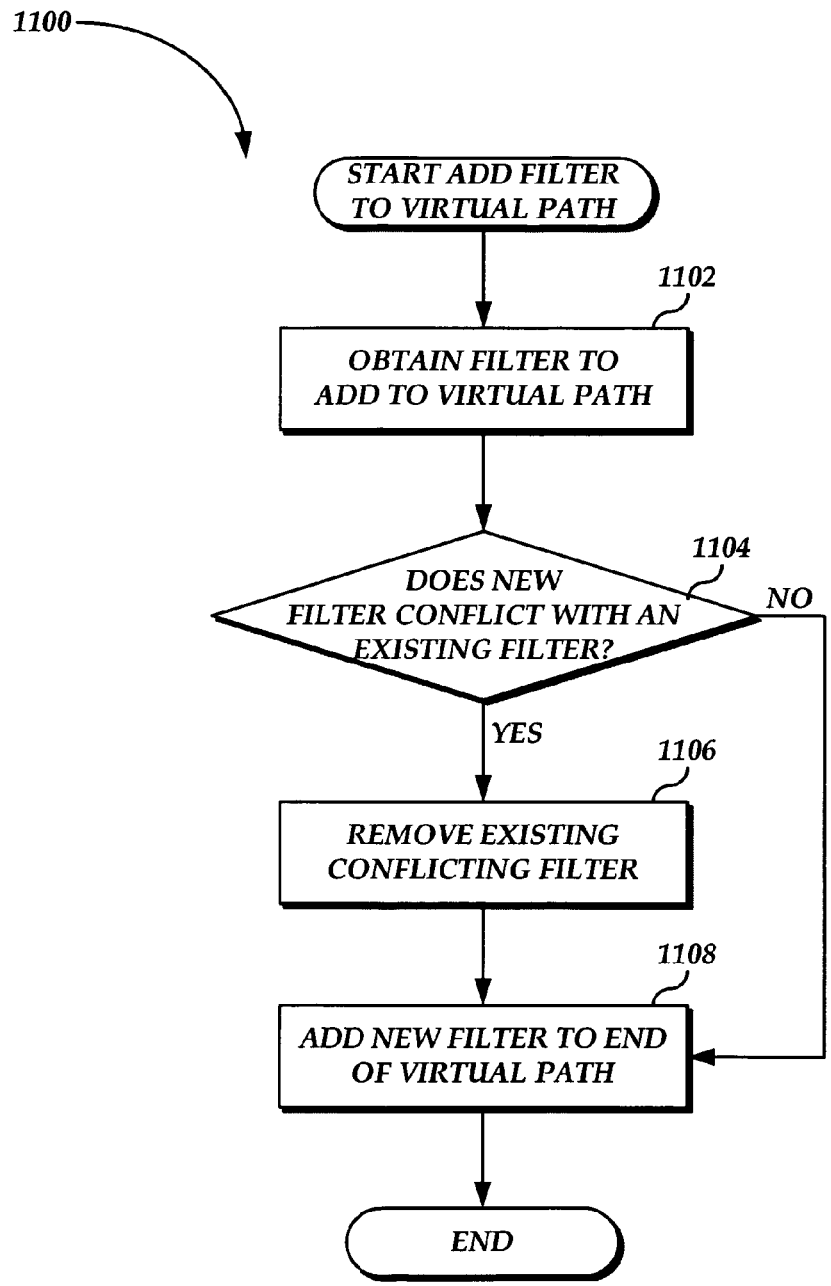
FIG. 11 is a flow diagram illustrating an illustrative add filter routine for adding a filter to a virtual address in a virtual address bar.

FIG. 11 is a flow diagram illustrating an exemplary add filter routine 1100 for adding a filter to a virtual address in a virtual address bar. Beginning at block 1102, the exemplary routine 1100 obtains the filter to be added to the virtual address. For example, as previously discussed in regard to FIG. 4, filters may be added to the virtual address according to user actions external to the virtual address bar, or alternatively, may be directly added to the virtual address bar by typing in the name of a predefined filter.

At block 1104, a determination is made whether the new filter conflicts with an existing filter already in the virtual address. As previously discussed in regard to FIGS. 7A-7D, a new filter may conflict with an existing filter by substantially narrowing or broadening the scope of the existing filter. Alternatively, a new filter may conflict with an existing filter because a new filter is mutually exclusive to an existing filter. If, at decision block 1104, the new filter conflicts with an existing filter, at block 1106, the existing filter is removed from the virtual address. Alternatively, at 1104, if the new filter does not conflict with an existing filter or, after removing the existing conflicting filter in block 1106, at block 1108, the new filter is added at the end of the virtual address. Thereafter, the exemplary routine 1100 terminates.

Figure 12:
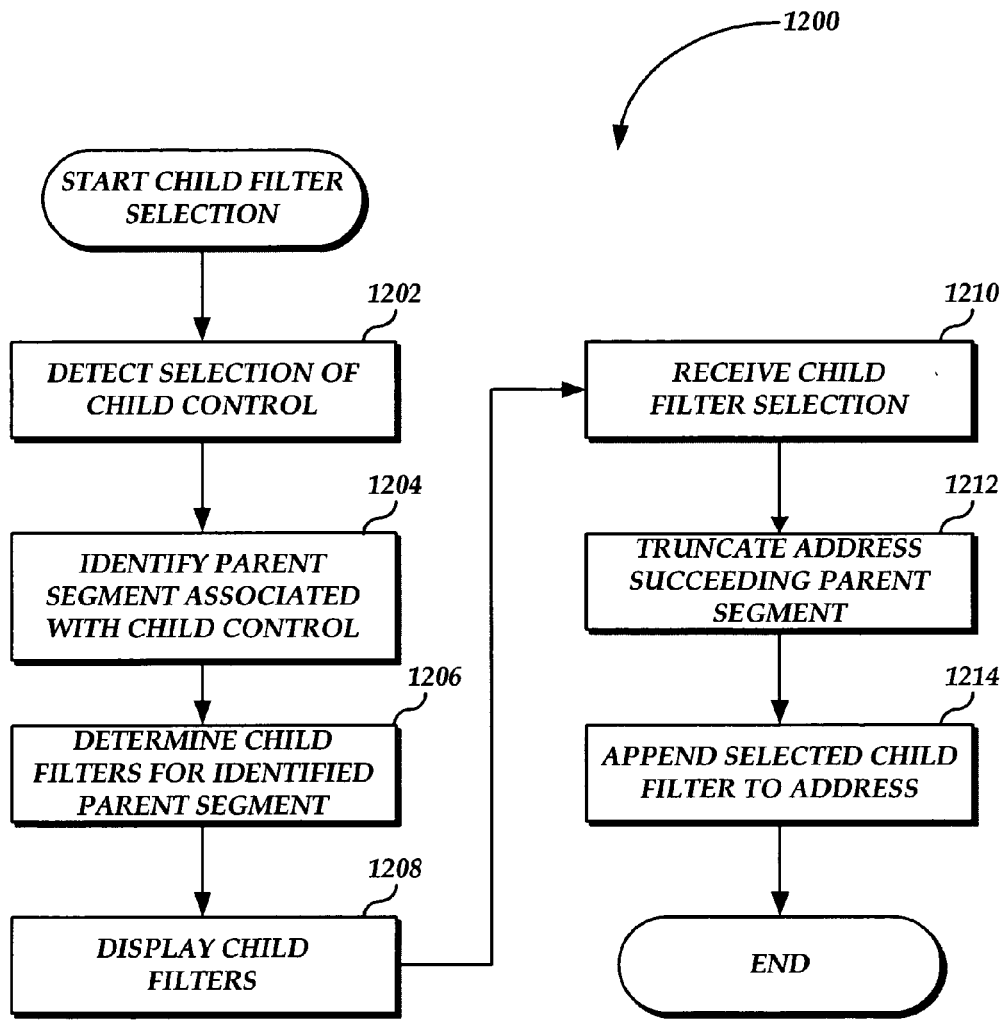
FIG. 12 is a flow diagram illustrative of a child filter selection routine for selecting child filters in a virtual address bar according to aspects of the present invention.

FIG. 12 is a flow diagram illustrative of a selection routine 1200 for selecting a child filter or selection criteria for an associated segment in a virtual address bar. Beginning at block 1202, the routine 1200 detects a selection of a child control. The child filter selection process is described above in regard to FIGS. 13A-13D. At block 1204, the parent segment associated with the selected child control is identified. At block 1206, the child filters for the identified parent segment are determined from a predetermined list of child filters. At block 1208, the child filters are displayed to the user. At block 1210, a child filter selection from the displayed child filters is received from the user. At block 1212, the virtual address is truncated by removing the segments succeeding the parent segment. At block 1214, a segment representing the selected child filter is appended to the remaining segments in the virtual address bar. Thereafter, the routine 1300 terminates.

While the preferred embodiments of the invention have been illustrated and described, it will be appreciated that various changes can be made therein without departing from the spirit and scope of the invention.

What is claimed is:

1. An address bar user interface control for selecting content accessible to a computer system for display, the address bar comprising:
   a plurality of interactive segments each including selection criteria for selecting content for display; and
   a child control associated with the at least one interactive segment, the child control being selectable to identify selectable child selection criteria corresponding to the selection criteria of the at least one interactive segment, wherein selecting the child control associated with an interactive segment in the plurality of interactive segments causes display of a list of selectable child selection criteria, and wherein selection of a child selection criterion from the list of selectable child selection criteria further causes removal of each interactive segment subsequent to the interactive segment, associated with the selected child control, from the address bar.

2. The address bar user interface control of claim 1, further comprising an interactive segment corresponding to a child selection criterion, wherein selecting the child selection criterion from the list of selectable child selection criteria causes the interactive segment corresponding to the child selection criterion to be displayed succeeding the at least one interactive segment.

3. The address bar user interface control of claim 1, wherein if the interactive segment associated with the child selection criteria has an immediate ancestor selection criteria and the immediate ancestor selection criteria is not displayed, selecting the child control associated with the interactive segment further causes an ancestor list for the interactive segment to be displayed.

4. The address bar user interface control of claim 1, further comprising type identifiers associated with each of the child selection criteria in the list of selectable child selection criteria.

5. The address bar user interface control of claim 1, wherein a child selection criterion includes selection criteria for selecting content stored in a virtual location.

6. The address bar user interface control of claim 1, wherein the at least one interactive segment includes at least two selection criteria which are logically combined for selecting content for display.

7. A computer-readable storage medium having computer-executable instructions stored thereon that, when executed by a computing device, cause the computing device to perform operations comprising:
   displaying an address bar comprising a plurality of interactive segments, each interactive segment including at least one selection criteria for selecting content to be displayed on a display device, wherein the address bar selects content for display on a display device according to the at least one selection criteria of each of the plurality of interactive segments;
   a child control for a first interactive segment of the plurality of interactive segments, the child control being selectable to display selectable child selection criteria;
   in response to selection of the child control, displaying the selectable child selection criteria; and
   upon selection of a selectable child selection criterion, causing each interactive segment subsequent to the first interactive segment to be removed from the address bar in response to the user selection of the selectable child selection criterion.

8. The computer-readable medium of claim 7, further comprising causing a second interactive segment corresponding to the child selection criterion to be displayed succeeding the first interactive segment in response to the user selection of the child selection criterion.

9. The computer-readable medium of claim 7, wherein displaying further comprises displaying a second interactive segment including at least two selection criteria which are logically combined for selecting content for display.

10. The computer-readable medium of claim 9, wherein the at least two selection criteria are logically combined by applying a logical OR operation.

11. A computing device comprising:
   one or more processors; and
   one or more computer storage media having computer-executable instructions stored thereon to:
   display an address bar comprising a plurality of interactive segments, each interactive segment including at least one selection criteria for selecting content to be displayed on a display device, wherein the address bar selects content for display on a display device according to the at least one selection criteria of each of the plurality of interactive segments;

display a child control for a first interactive segment of the plurality of interactive segments, the child control being selectable to display selectable child selection criteria;

in response to selection of the child control, displaying the selectable child selection criteria; and upon selection of a selectable child selection criterion, causing each interactive segment subsequent to the first interactive segment to be removed from the address bar in response to the user selection of the selectable child selection criterion.

12. The computing device of claim 11, wherein the media further comprises computer-executable instructions causing a second interactive segment corresponding to the child selection criterion to be displayed succeeding the first interactive segment in response to the user selection of the child selection criterion.

13. The computing device of claim 11, wherein, wherein displaying the address bar further comprises displaying a second interactive segment including at least two selection criteria which are logically combined for selecting content for display.

14. The computing device of claim 13, wherein the at least two selection criteria are logically combined by applying a logical OR operation.

15. The computing device of claim 11, wherein the at least one selection criteria includes selection criteria for selecting content stored in a virtual location.

16. The computing device of claim 11, wherein the at least one selection criteria includes selection criteria for selecting content stored in a physical location.

17. The computing device of claim 11, wherein if the first interactive segment associated with the child selection criteria has an immediate ancestor selection criteria and the immediate ancestor selection criteria is not displayed, selecting the child control associated with the interactive segment further causes an ancestor list for the first interactive segment to be displayed.

* * * * *